(12) United States Patent
Murakami et al.

(10) Patent No.: US 12,523,871 B2
(45) Date of Patent: Jan. 13, 2026

(54) IMAGE PROJECTION DEVICE

(71) Applicant: KOITO MANUFACTURING CO., LTD., Tokyo (JP)

(72) Inventors: Kazuomi Murakami, Shizuoka (JP); Takanobu Toyoshima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 317 days.

(21) Appl. No.: 18/284,465

(22) PCT Filed: Mar. 25, 2022

(86) PCT No.: PCT/JP2022/014435
§ 371 (c)(1),
(2) Date: Sep. 27, 2023

(87) PCT Pub. No.: WO2022/210363
PCT Pub. Date: Oct. 6, 2022

(65) Prior Publication Data
US 2024/0168287 A1 May 23, 2024

(30) Foreign Application Priority Data
Mar. 31, 2021 (JP) ................................. 2021-059580

(51) Int. Cl.
*G02B 27/01* (2006.01)
*B60K 35/23* (2024.01)
(Continued)

(52) U.S. Cl.
CPC .......... *G02B 27/0101* (2013.01); *B60K 35/23* (2024.01); *G02B 5/10* (2013.01); *B60K 35/10* (2024.01)

(58) Field of Classification Search
CPC .. G02B 27/0101; G02B 5/10; G02B 17/0621; B60K 35/23; B60K 35/10; B60K 2360/23; B60K 2360/25; B60K 2360/334
See application file for complete search history.

(56) References Cited

U.S. PATENT DOCUMENTS

2019/0146217 A1   5/2019   Yamamura et al.
2019/0235238 A1   8/2019   Choi et al.
(Continued)

FOREIGN PATENT DOCUMENTS

JP   51-061723 A       5/1976
JP   2017-049371 A    3/2017
(Continued)

OTHER PUBLICATIONS

International Search Report for PCT/JP2022/014435 dated May 17, 2022.

*Primary Examiner* — James C. Jones
(74) *Attorney, Agent, or Firm* — Sughrue Mion, PLLC

(57) ABSTRACT

An image projection device that can effectively curb an increase in temperature of an image projecting unit due to external light while maintaining quality of a projected image is provided. The image projection device includes an image projecting unit configured to emit projection light including an image, a first freeform curved mirror reflecting the projection light incident from the image projecting unit, an intermediate mirror reflecting the projection light incident from the first freeform curved mirror, and a second freeform curved mirror reflecting the projection light incident from the intermediate mirror and causing the projection light to reach a viewpoint. A component in at least one imaging axis direction of the projection light reflected by the first freeform curved mirror forms an image at an intermediate imaging position before the projection light reaches the (Continued)

second freeform curved mirror, and the intermediate mirror is arranged at the intermediate imaging position.

8 Claims, 5 Drawing Sheets

(51) Int. Cl.
  *G02B 5/10* (2006.01)
  *B60K 35/10* (2024.01)

(56) References Cited

U.S. PATENT DOCUMENTS

| | | |
|---|---|---|
| 2019/0285887 A1 | 9/2019 | Yasui et al. |
| 2020/0033607 A1 | 1/2020 | Takeda et al. |
| 2022/0252853 A1* | 8/2022 | Zhu ..................... G02B 17/06 |

FOREIGN PATENT DOCUMENTS

| | | |
|---|---|---|
| JP | 2017-173557 A | 9/2017 |
| JP | 2019-159283 A | 9/2019 |
| JP | 2020-020858 A | 2/2020 |
| WO | 2016/171154 A1 | 10/2016 |
| WO | 2017/195740 A1 | 11/2017 |

* cited by examiner

IMAGE PROJECTION DEVICE

This Application is a National Stage of International Application No. PCT/JP2022/014435 filed Mar. 25, 2022, claiming priority based on Japanese Patent Application No. 2021-059580 filed Mar. 31, 2021.

TECHNICAL FIELD

The invention relates to an image projection device and particularly to an image projection device that causes projection light from an image projecting unit to be reflected by a plurality of freeform curved mirrors and to reach a viewpoint.

BACKGROUND ART

In the related art, an instrument panel displaying an icon by lighting has been used as a device displaying various kinds of information in a vehicle. With increases in amounts of information to be displayed, embedding an image display device in the instrument panel or configuring the whole instrument panel as an image display device has also been proposed.

However, since the instrument panel is located below the front glass (windshield) of the vehicle, a driver needs to move a sight line down while driving in order to see information displayed on the instrument panel, which is not desirable. Therefore, an image projection device such as a head-up display (hereinafter referred to as an HUD) that can allow a driver to read information while viewing the front of the vehicle by projecting an image to the front glass has been proposed.

In such an image projection device according to the related art, an image projecting unit emits projection light including an image, one or more freeform curved mirrors are caused to reflect the projection light, and the projection light is caused to reach a viewpoint position of a driver or the like such that the image is formed in a space. Accordingly, the driver or the like can recognize the image as if the image were displayed at an imaging position in a depth direction by the projection light incident on the viewpoint.

However, in the image projection device using freeform curved minors, when solar light or the like is incident as external light from the outside, the external light may be focused on the surface of the image projecting unit by the freeform curved mirrors and thus there is a likelihood of deterioration due to an increase in temperature of the image projecting unit. Therefore, a method in which projection light intermediately forms an image between a plurality of freeform curved mirrors and a light blocking part or an infrared cut filter is disposed in the vicinity of an intermediate imaging position to reduce an influence of external light reaching the image projecting unit from the outside has also been proposed (for example, see Patent Literatures 1 and 2).

CITATION LIST

Patent Literature

[Patent Literature 1] WO 2017/195740
[Patent Literature 2] Japanese Unexamined Patent Application Publication No. 2017-173557 (JP 2017-173557 A)

SUMMARY OF THE INVENTION

However, in a structure using a light blocking part described in Patent Literature 1, external light reaching the image projecting unit through a space for securing an optical path of projection light cannot be blocked, and thus incidence restriction of external light is limited. In a structure using an infrared cut filter described in Patent Literature 2, an aberration occurs when projection light passes through the infrared cut filter and thus there is a problem in that quality of a projected image decreases.

Therefore, the invention was made in consideration of the problem in the related art and provides an image projection device that can effectively curb an increase in temperature of an image projecting unit due to external light while maintaining quality of a projected image.

In order to solve the aforementioned problem, according to the invention, there is provided an image projection device including: an image projecting unit emits projection light including an image; a first freeform curved mirror reflecting the projection light incident from the image projecting unit; an intermediate mirror reflecting the projection light incident from the first freeform curved mirror; and a second freeform curved mirror reflecting the projection light incident from the intermediate mirror and causing the projection light to reach a viewpoint, wherein a component in at least one imaging axis direction of the projection light reflected by the first freeform curved mirror forms an image at an intermediate imaging position before the projection light reaches the second freeform curved mirror, and the intermediate mirror is arranged at the intermediate imaging position.

In the image projection device according to the invention, since the intermediate mirror is arranged at the intermediate imaging position of the first freeform curved mirror, external light reaching the image projecting unit is restricted by external light reflected by the second freeform curved mirror, the intermediate mirror, and the first freeform curved mirror. Accordingly, it is possible to reduce external light reaching the image projecting unit 10 and to effectively curb an increase in temperature of an image projecting unit due to external light while maintaining quality of a projected image. In an aspect of the invention, a length in the imaging axis direction of the intermediate mirror may be less than a length in the imaging axis direction in an effective irradiation area of the image projecting unit.

In an aspect of the invention, the intermediate mirror may be a planar mirror having a substantially flat reflective surface.

In an aspect of the invention, the intermediate mirror may be a cold mirror which is formed of a dielectric multilayer and which reflects visible light and transmits infrared light and/or ultraviolet light.

In an aspect of the invention, external light incident on the second freeform curved mirror in a reflection direction of the projection light from the second freeform curved minor may be reflected by the second freeform curved minor and then be focused at a position farther than the intermediate mirror.

In an aspect of the invention, a reference light beam of the projection light from the image projecting unit to the second freeform curved minor may form the same propagation plane, and the imaging axis direction may be included in the propagation plane.

In an aspect of the invention, a polarizing filter transmitting a component in a polarization direction of the projection light may be provided on an optical path of the projection light from the image projecting unit to the second freeform curved mirror.

In an aspect of the invention, the polarizing filter may be formed as a unified body with the intermediate minor.

According to the invention, it is possible to provide an image projection device that can effectively curb an increase in temperature of an image projecting unit due to external light while maintaining quality of a projected image.

BRIEF DESCRIPTION OF THE DRAWINGS

FIG. 1(a) is a schematic top view and FIG. 1(b) is a schematic side view.

FIG. 4(a) illustrates a path of projection light and FIG. 4(b) illustrates a path of external light.

MODES FOR CARRYING OUT THE INVENTION

First Embodiment

Figure 1A:
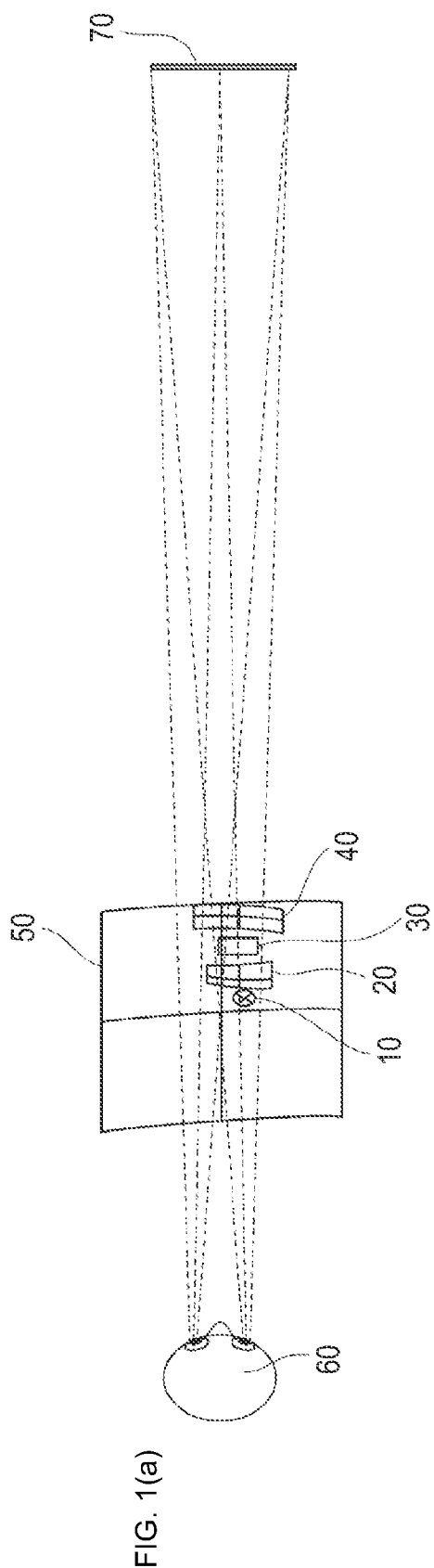
FIGS. 1(a) and 1(b) are diagrams schematically illustrating a configuration of an image projection device according to a first embodiment of the invention, where
Figure 1B:
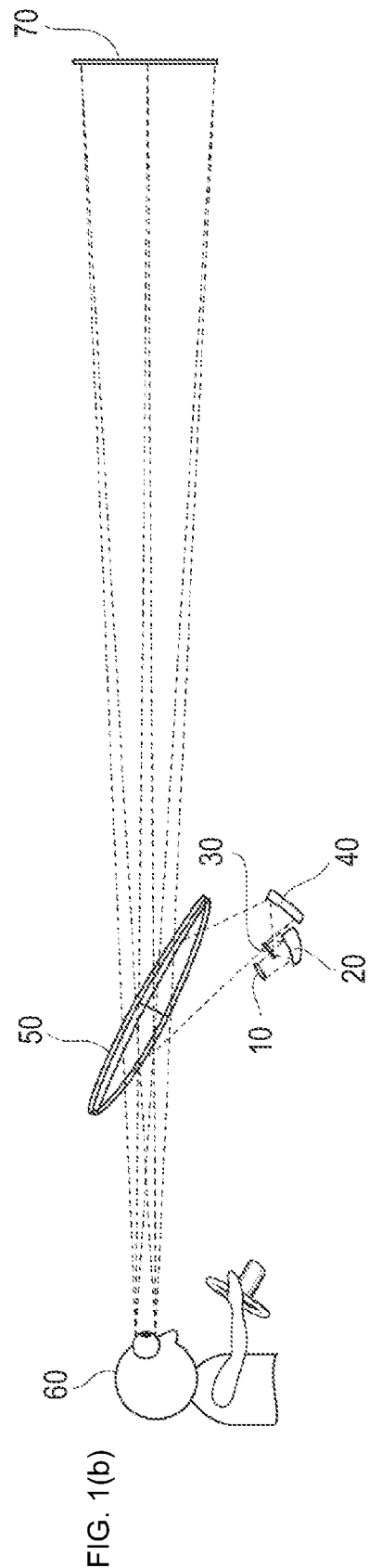

Hereinafter, an embodiment of the invention will be described in detail with reference to the accompanying drawings. The same or corresponding elements, members, and processes in the drawings will be referred to by the same reference signs, and repeated description thereof will be appropriately omitted. FIGS. 1(a) and 1(b) are diagrams schematically illustrating a configuration of an image projection device according to this embodiment, where FIG. 1(a) is a schematic top view and FIG. 1(b) is a schematic side view. As illustrated in FIGS. 1(a) and (b), the image projection device includes an image projecting unit 10, freeform curved mirrors 20 and 40, an intermediate mirror 30, and a windshield 50 and enables a virtual image 70 to be seen from a position of a viewpoint 60 via the windshield 50.

The image projecting unit 10 is a device that emits projection light including image information in response to supply of a signal including the image information from an information processing unit (not illustrated). Projection light emitted from the image projecting unit 10 is incident on the freeform curved mirror 20. Examples of the image projecting unit 10 include a liquid crystal display device, an organic EL display device, a micro LED display device, and a projector device using a laser light source.

The freeform curved mirror 20 is a concave mirror on which projection light emitted from the image projecting unit 10 is incident and which reflects the incident projection light to the intermediate mirror 30, and corresponds to a first freeform curved mirror in the invention. A reflective surface of the freeform curved mirror 20 is set such that at least one of an x-axis component and a y-axis component on the surface intermediately forms an image at a position of the intermediate mirror 30 as will be described later.

The intermediate mirror 30 is a reflecting mirror on which projection light reflected by the freeform curved mirror 20 is incident and which reflects the incident projection light to the freeform curved mirror 40. The intermediate mirror 30 may be any of a concave mirror, a convex mirror, and a planar mirror, but since optical designs and aberration correction are complicated and costs increase when a concave mirror or a convex mirror is used, it is preferable that a planar mirror having a substantially flat reflective surface be used. The intermediate mirror has a size and a shape in which projection light reflected by the freeform curved mirror 20 can all be reflected.

It is preferable that a cold mirror which is constituted by a dielectric multilayer and which reflects visible light and transmits infrared light and/or ultraviolet light be employed as the intermediate mirror 30. When the intermediate mirror 30 is constituted by a cold mirror, projection light including visible light for projecting a virtual image 70 can be reflected well to form an image. Since the intermediate mirror constituted by a cold mirror does not reflect but transmits infrared light and/or ultraviolet light included in external light, infrared light and/or ultraviolet light does not reach the image projecting unit 10 via the freeform curved mirror 20 as will be described later and thus it is possible to curb an increase in temperature of the image projecting unit 10.

The freeform curved mirror 40 is a concave mirror on which projection light reflected by the intermediate mirror 30 is incident and which reflects the incident projection light to the windshield 50, and corresponds to a second freeform curved mirror in the invention. A reflective surface of the freeform curved mirror 40 is also set such that focal distances for an x-axis component and a y-axis component on the surface are different and the x-axis component and the y-axis component form an image at the same position after the projection light has been reflected by the freeform curved mirror 40.

The windshield 50 is provided in front of a driver's seat of the vehicle and has a function of a transmission and reflection part reflecting projection light incident from the freeform curved mirror 40 toward the viewpoint 60 and transmitting light from the outside of the vehicle toward the viewpoint 60 on the surface inside of the vehicle. Here, the windshield 50 is used as the transmission and reflection part, but a combiner may be provided as the transmission and reflection part separately from the windshield 50 such that light from the freeform curved mirror 40 is reflected to the viewpoint 60. The transmission and reflection part is not limited to being located on the front side of the vehicle and may be provided on a lateral side or the rear side as long as it projects an image to the viewpoint 60 of an occupant.

The viewpoint 60 is an eye (an eye box) of a driver or an occupant of the vehicle, and the driver or the occupant visually recognizes a formed virtual image 70 when projection light is incident on the eye box and reaches the retina.

The virtual image 70 is displayed to be formed in a space when projection light reflected by the windshield 50 reaches the viewpoint (eye box) 60 of the driver or the like. The position at which the virtual image 70 is formed is determined by a spread angle when light emitted from the image projecting unit 10 propagates to the viewpoint 60 after the light has been reflected by the freeform curved mirror 20, the intermediate mirror 30, and the freeform curved mirror 40. As illustrated in FIGS. 1(a) and 1(b), projection light reflected by the freeform curved mirror 40 is reflected by the windshield 50 and then reaches the viewpoint 60 while a light beam is spreading.

At this time, the driver or the occupant of the viewpoint 60 recognizes the virtual image 70 as if it were present at an imaging position farther than the windshield 50. Here, the imaging position of the virtual image 70 mainly depends on a combined focal distance of the freeform curved minor 20, the intermediate mirror 30, and the freeform curved mirror 40. Even when the windshield 50 does not have a flat surface but a curved surface, the radius of curvature is larger than those of the freeform curved mirror 20 and the freeform curved mirror 40 and thus an influence of an optical power of the windshield 50 can be ignored.

Figure 2:
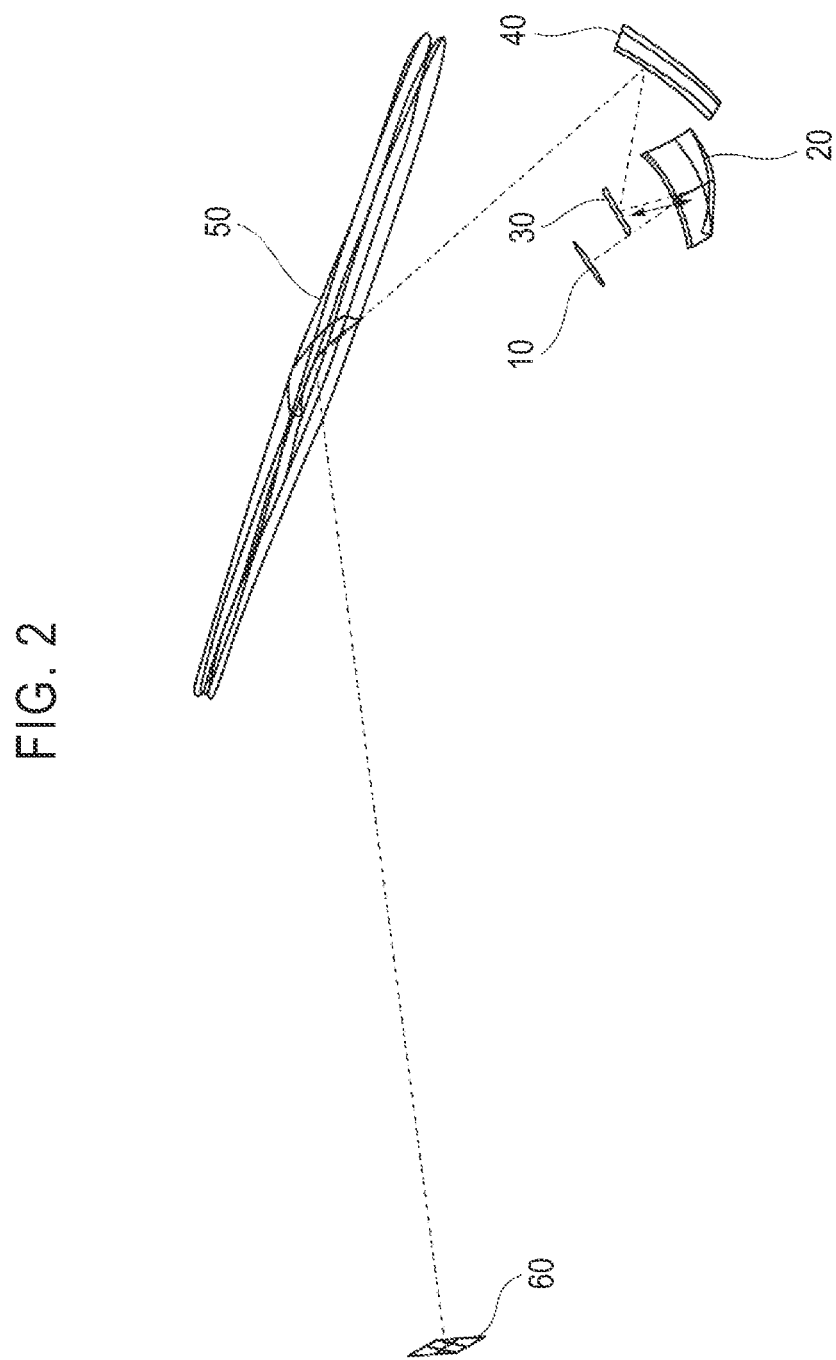
FIG. 2 is a diagram schematically illustrating arrangement of optical members and a reference light beam in the image projection device according to the first embodiment.

FIG. 2 is a diagram schematically illustrating arrangement of optical members and a reference light beam in the image projection device according to this embodiment. As illustrated in FIG. 2, projection light emitted from the image projecting unit 10 is reflected by the freeform curved mirrors 20, the intermediate mirror 30, the freeform curved mirror 40, and the windshield 50 and reaches the viewpoint 60. At this time, a trajectory of light reaching the viewpoint 60 in the direction in which the virtual image 70 is seen is defined as a reference light beam which is indicated by a dotted line in FIG. 2. In other words, the reference light beam can be considered to be substantially the same as a trajectory of light emitted from the center of an effective area from which light is emitted in the image projecting unit 10 until the light reaches the viewpoint 60. Actual projection light is light which is emitted with a predetermined area from the image projecting unit 10 and of which a light beam spreads from positions of the emission surface thereof, and is focused with a positive power of the reflective surfaces of the freeform curved minor 20 and the freeform curved minor 40. Accordingly, the reference light beam illustrated in FIG. 2 does not indicate a path along which projection light propagates in the entire area of the image projecting unit 10. A distance from the freeform curved minor 20 to the intermediate minor 30 along the reference light beam is defined as D.

Figure 3:
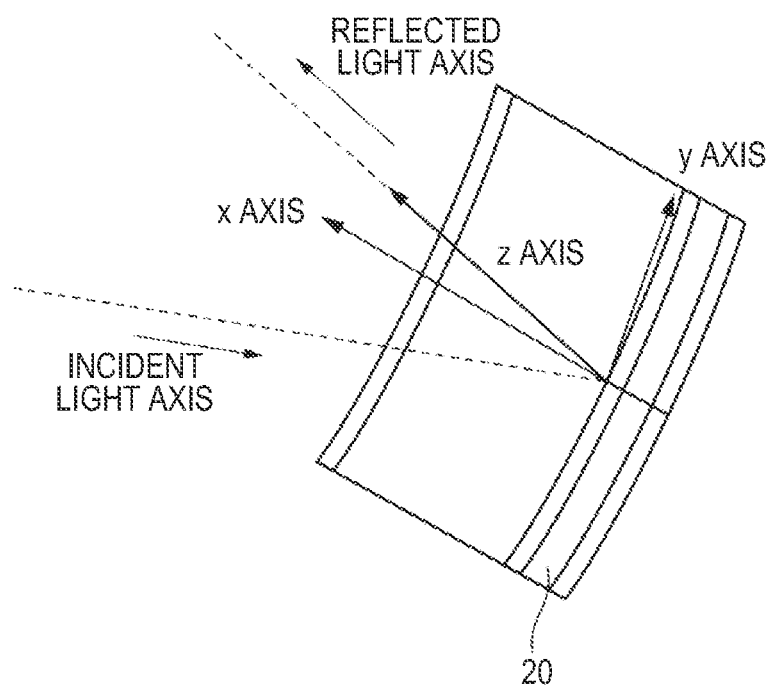
FIG. 3 is a diagram schematically illustrating a reference light beam and a local coordinate system in a freeform curved mirror 20.

FIG. 3 is a diagram schematically illustrating a reference light beam and a local coordinate system in the freeform curved mirror 20. A dotted line illustrated in FIG. 3 is the reference light beam of projection light indicated by the dotted line in FIG. 2. The reference light beam in a direction in which projection light is incident on the freeform curved minor 20 is defined as an incident light beam, and the reference light beam in a direction in which projection light is reflected therefrom is defined as a reflected light beam.

As illustrated in FIG. 3, the reflection direction of the reference light beam in the freeform curved mirror 20 is defined as a z axis. A direction perpendicular to the z axis in a plane including the incidence direction of the reference light beam and the z axis in the freeform curved mirror 20 is defined as a y axis. A direction perpendicular to the y axis and the z axis is defined as an x axis.

The freeform curved minor 20 includes a curved surface having different curvatures in the x-axis direction and the y-axis direction, and projection light reflected therefrom is focused on different focal distances for an x-axis component and a y-axis component. In this embodiment, at least one of the x-axis component and the y-axis component intermediately forms an image at an intermediate imaging position separated by the distance D along the reference light beam from the freeform curved mirror 20. Here, when parallel light is incident on the freeform curved mirror 20 from the image projecting unit 10 and a distance to a position on which light subjected to the positive power by the freeform curved mirror 20 is focused is defined as a focal distance f1, a focal distance of the x-axis component is defined as fx1 and the focal distance of the y-axis component is defined as fy1. Accordingly, the intermediate imaging position separated by the distance D along the reference light beam from the freeform curved mirror 20 is substantially the same as the focal distance fx1 or fx2 of the freeform curved mirror 20.

Here, an axial direction of one of the x-axis component and the y-axis component forming an image at the intermediate imaging position is defined as an imaging axis direction. That is, when the x-axis component of the projection light forms an image at the intermediate imaging position of the focal distance fx1, the x-axis direction is the imaging axis direction. When the y-axis component forms an image at the intermediate imaging position of the focal distance fy1, the y-axis direction is the imaging axis direction. The imaging axis direction in which an image is formed at the intermediate imaging position may be at least one intermediate imaging position, but an image may be formed at the same intermediate imaging position for both the x-axis direction and the y-axis direction.

However, when an image is formed at the intermediate imaging position for both the x-axis direction and the y-axis direction, aberrations for the x-axis component and the y-axis component increase and a degree of difficulty for correcting the aberrations using the freeform curved mirror 40 increases. Since the radii of curvature in the x-axis direction and the y-axis direction of the freeform curved mirror 20 needs to be decreased to intermediately form an image for the x-axis component and the y-axis component, a distance between the freeform curved mirror 40 and the freeform curved mirror 20 increases and thus a decrease in size of the image projection device is difficult.

On the other hand, by employing a configuration in which only one of the x-axis component and the y-axis component of projection light forms an image at the intermediate imaging position, an aberration generated due to the positive power of the freeform curved mirror 20 increases for only one of the x-axis component and the y-axis component and an optical design for correcting an aberration using the freeform curved mirror 40 is simplified. Since the radius of curvature in the x-axis direction or the y-axis direction of the freeform curved mirror 20 can be increased, it is possible to achieve a decrease in size of the image projection device by decreasing displacement in the thickness direction of the freeform curved mirror 20.

Similarly, the freeform curved mirror 40 includes a curved surface having different curvatures in the x-axis direction and the y-axis direction, and projection light reflected therefrom has different focal distances for the x-axis component and the y-axis component. Here, when parallel light is incident on the freeform curved mirror 40 and a distance to a position on which light subjected to the positive power by the freeform curved mirror 40 is focused is defined as a focal distance f2, a focal distance of the x-axis component is defined as fx2 and the focal distance of the y-axis component is defined as fy2.

As described above, the focal distance fx1 and the focal distance fy1 in the freeform curved mirror 20 are set such that at least one component intermediately forms an image at the intermediate imaging position between the freeform curved mirror 20 and the freeform curved mirror 40. The focal distance fx2 and the focal distance fy2 in the freeform curved mirror 40 are set such that the x-axis component and the y-axis component of the projection light reflected by the freeform curved mirror 40 form an image at the same position. Accordingly, the virtual image 70 seen from the viewpoint 60 is an image which the x-axis component and the y-axis component form at the same position, and the virtual image 70 can be appropriately recognized as an image as if it were present at the imaging position. By appropriately setting the curved surface shape of the freeform curved mirror 40, it is also possible to correct an aberration generated in the projection light reflected by the freeform curved mirror 20.

Figure 4A:
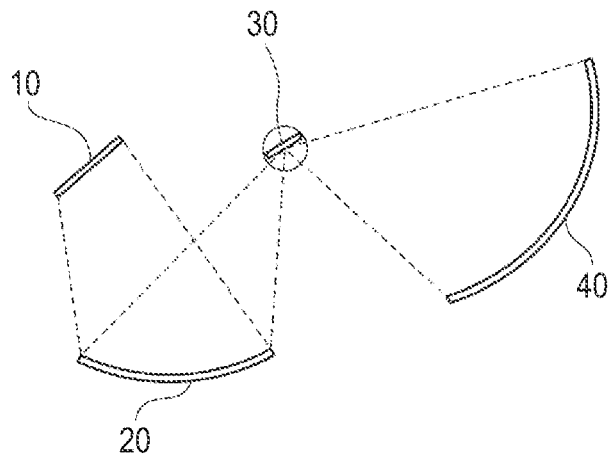
FIGS. 4(a) and 4(b) are diagrams schematically illustrating reflection of light in an intermediate mirror 30, where
Figure 4B:
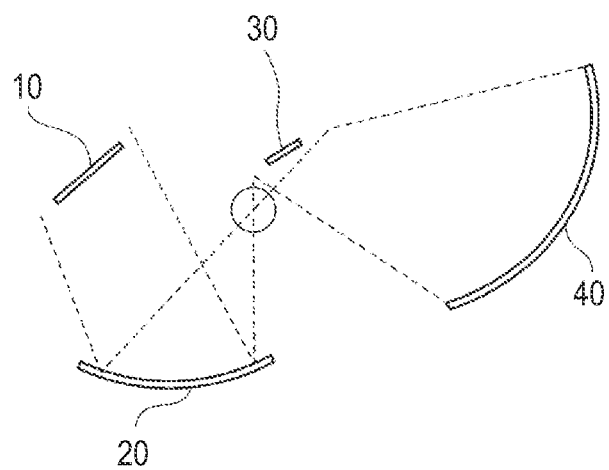

FIGS. 4(a) and (b) are diagrams schematically illustrating reflection of light in the intermediate mirror 30, where FIG. 4(a) illustrates a path of projection light and FIG. 4(b) illustrates a path of external light. In FIGS. 4(a) and 4(b), the drawing surface is a yz plane including the y-axis direction and the z-axis direction illustrated in FIG. 3, and a direction perpendicular to the drawing surface is the x-axis direction. In the example illustrated in FIGS. 4(a) and 4(b), the reference light beam of projection light has a path in only the yz plane and has no displacement in the x-axis direction, and a component of the projection light intermediately forming an image is the y-axis component. That is, the reference light beam of the projection light from the image projecting unit 10 to the freeform curved mirror 40 forms the same propagation plane, and the imaging axis direction is included in the propagation plane. Accordingly, it is possible to reduce an aberration of the x-axis component in the freeform curved mirror 20. Since the reference light beam from the freeform curved mirror 40 to the windshield 50 has a path in only the yz plane and only displacement of the y-axis component included in the yz plane has to be considered, it is possible to facilitate correction of an aberration.

As illustrated in FIG. 4(a), projection light emitted from the image projecting unit 10 is reflected by the freeform curved mirror 20, and the y-axis component forms an image at the intermediate imaging position indicated by a circular mark in the drawing. The intermediate mirror 30 is disposed at the intermediate imaging position and reflects the projection light to the freeform curved mirror 40. At this time, since the y-axis component of the projection light is focused on the intermediate imaging position to form an image, a length in the imaging axis direction (the y-axis direction) of the intermediate mirror 30 can be set to be less than a length in the imaging axis direction of an effective irradiation area of the image projecting unit 10.

As illustrated in FIG. 4(b), external light incident from the outside of the image projection device is reflected by the freeform curved mirror 40 and reaches the intermediate mirror 30. Here, the intermediate mirror 30 is disposed at a position closer to the freeform curved mirror 40 than the position on which external light incident on the freeform curved mirror 40 is focused. That is, external light incident on the freeform curved mirror 40 in the reflection direction of projection light in the freeform curved mirror 40 is reflected by the freeform curved mirror 40 and is then focused at a position farther than the intermediate mirror 30. External light reaching the intermediate mirror is reflected to the freeform curved mirror 20 by the intermediate mirror 30, is focused at a focusing position of external light indicated by a circular mark in the drawing, and then reaches the freeform curved mirror 20. In the freeform curved mirror 20, external light is reflected to the image projecting unit 10.

Here, since the intermediate mirror 30 is disposed at a position closer to the freeform curved mirror 40 than the focusing position of the freeform curved mirror 40, external light reflected to the intermediate mirror 30 by the freeform curved mirror 40 is applied to a wider range than the intermediate mirror 30. Accordingly, a ratio of external light reflected to the freeform curved mirror 20 by the intermediate mirror 30 to external light reflected by the freeform curved mirror 40 decreases as the area of the intermediate mirror 30 decreases.

The intermediate mirror 30 is disposed at the intermediate imaging position in the freeform curved mirror 20, and external light reflected by the intermediate mirror 30 is focused between the intermediate mirror 30 and the freeform curved mirror 20. Accordingly, external light reflected to the image projecting unit 10 by the freeform curved mirror 20 is applied to a wider range than the image projecting unit 10. As a result, the ratio of external light incident on the image projecting unit 10 to external light reflected by the freeform curved mirror 20 decreases. Since the density of external light reaching the image projecting unit 10 also decreases, it is possible to decrease the likelihood that external light is focused on the surface of the image projecting unit 10 to locally increase the temperature thereof and to deteriorate the emission surface thereof.

Figure 5:
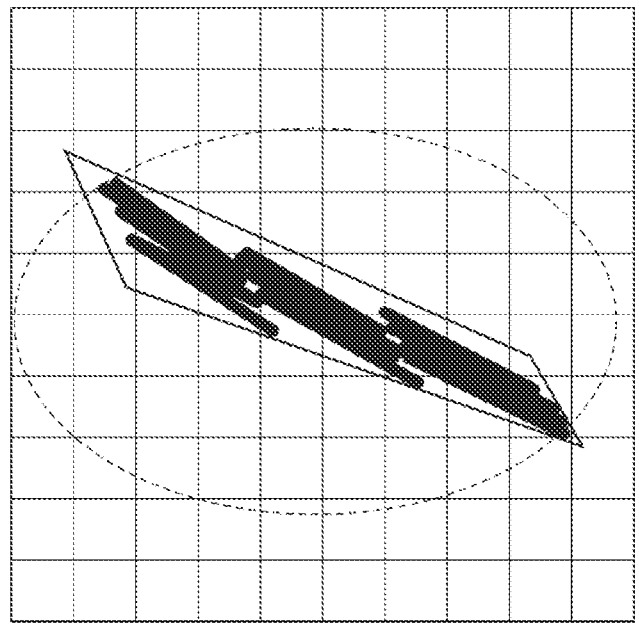
FIG. 5 is a diagram schematically illustrating a shape of the intermediate mirror 30 and irradiation areas of projection light and external light.

FIG. 5 is a diagram schematically illustrating a shape of the intermediate mirror 30 and irradiation areas of projection light and external light. An area indicated by a solid line in the drawing represents a reflective surface of the intermediate mirror 30. An area painted with black in the drawing represents an area to which projection light reflected by the freeform curved mirror 20 and reaching the intermediate mirror 30 is applied. A dotted line in the drawing indicates an area to which external light reflected by the freeform curved mirror 40 and reaching the intermediate mirror 30 is applied. The vertical direction in the drawing represents the y-axis direction, and the horizontal direction represents the x-axis direction.

As illustrated in FIG. 5, since the y-axis component of projection light reaching the intermediate mirror 30 intermediately forms an image, the irradiation area in the y-axis direction is narrowed. The intermediate mirror 30 needs to include the whole projection light in the reflective surface thereof, and external light reaching the image projecting unit 10 can be decreased as the area of the intermediate mirror 30 decreases as described above. Accordingly, it is preferable that the ratio of external light indicted by the dotted line in the irradiation area be decreased by decreasing the length in the y-axis direction of the intermediate mirror 30.

As described above, in the image projection device according to this embodiment, external light reaching the image projecting unit 10 is reduced by external light reflected by the freeform curved mirror 40, the intermediate mirror 30, and the freeform curved mirror 20 by disposing the intermediate mirror 30 at the intermediate imaging position of the freeform curved mirror 20. Accordingly, it is possible to reduce external light reaching the image projecting unit 10 and to effectively curb an increase in temperature of the image projecting unit 10 due to external light while maintaining quality of a projected image. Since the intermediate mirror 30 is disposed at a position closer to the freeform curved mirror 40 than the focused position of external light in the freeform curved mirror 40, it is possible to curb an increase in temperature by decreasing the ratio of external light reflected by the intermediate mirror 30 to external light reflected by the freeform curved mirror 40, decreasing the ratio of external light reaching the image projecting unit 10 to external light reflected by the freeform curved mirror 20, and further decreasing external light reaching the image projecting unit 10 as a whole.

Second Embodiment

A second embodiment of the invention will be described below with reference to FIG. 6. Description of the same details as in the first embodiment will be omitted. This embodiment is different from the first embodiment, in that the area of the intermediate mirror 30 is made to be as small as possible by optimizing the shape of the intermediate mirror 30 and thus external light reaching the image projecting unit 10 is decreased.

Figure 6:
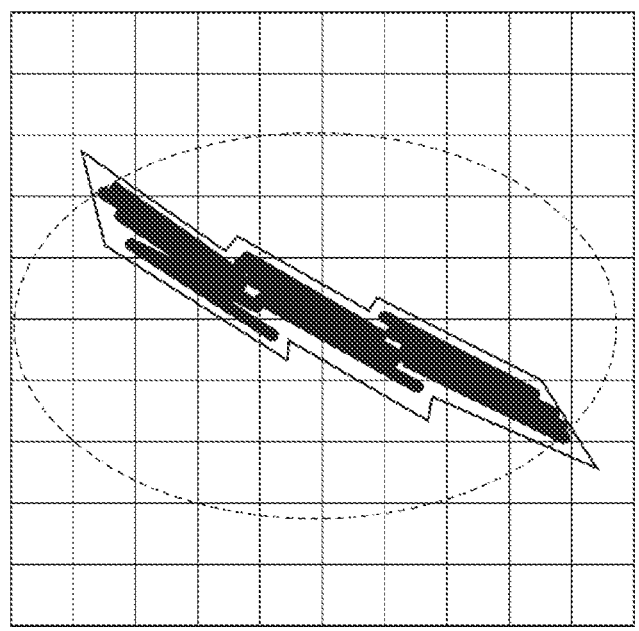
FIG. 6 is a diagram schematically illustrating a shape of an intermediate mirror 30 and irradiation areas of projection light and external light in an image projection device according to a second embodiment.

FIG. 6 is a diagram schematically illustrating a shape of an intermediate mirror 30 and irradiation areas of projection light and external light in an image projection device according to this embodiment. An area indicated by a solid line in the drawing represents a reflective surface of the intermediate mirror 30. An area painted with black in the drawing represents an area to which projection light reflected by the freeform curved mirror 20 and reaching the intermediate mirror 30 is applied. A dotted line in the drawing indicates an area to which external light reflected by the freeform curved mirror 40 and reaching the intermediate mirror 30 is applied. The vertical direction in the drawing represents the y-axis direction, and the horizontal direction represents the x-axis direction.

As illustrated in FIG. 6, the intermediate mirror 30 has an outer appearance along the area irradiated with projection light such that the area of the reflective surface thereof is made to be as small as possible. An area ratio of the area irradiated with projection to the reflective surface of the intermediate mirror 30 is preferable equal to or greater than 80% and more preferably equal to or greater than 90%.

With the image projection device according to this embodiment, by optimizing the shape of the intermediate mirror 30 to restrict the reflecting area of the intermediate mirror 30 to an area irradiated with projection light, it is possible to further decrease external light reaching the image projecting unit 10 and to effectively curb an increase in temperature.

Third Embodiment

A third embodiment of the invention will be described below. Description of the same details as in the first embodiment will be omitted. When the image projecting unit 40 employs a light crystal display device or a semiconductor laser, projection light may be polarized light in a predetermined direction. Therefore, in this embodiment, a polarizing filter (not illustrated) transmitting only a component in the same polarization direction as the polarized light of projection light from the image projecting unit 10 is provided in an optical path of the projection light from the image projecting unit 10 to the freeform curved mirror 40.

By disposing the polarizing filter in the optical path and matching the polarization direction of the projection light with a polarization direction of the polarizing filter, it is possible to cut polarized light in a direction different from the polarization direction of the polarizing filter out of external light reaching the image projection device and to curb an increase in temperature due to external light reaching the image projecting unit 10.

The position at which the polarizing filter is provided is not particularly limited, and may be one of a position between the image projecting unit 10 and the freeform curved mirror 20, a position between the freeform curved minor 20 and the intermediate mirror 30, and a position between the intermediate mirror 30 and the freeform curved mirror 40. The position is preferably a position at which polarized light from the image projecting unit 10 is maintained. The polarizing filter may be formed as a unified body with a light emission surface of the image projecting unit 10, a reflective surface of the freeform curved mirror 20, a reflective surface of the intermediate mirror 30, or a reflective surface of the freeform curved minor 40.

Particularly, it is preferable that a polarizing filter be formed on the reflective surface of the intermediate mirror 30 and the polarization direction of projection light and the polarization direction of polarized light transmitted by the polarizing filter be matched to cut light in a polarization direction different from that of the projection light. By integrally forming the intermediate mirror 30 and the polarizing filter, it is possible to cut polarized light in a direction different from the polarization direction of the polarizing filter out of external light reaching the intermediate minor 30 and to curb an increase in temperature due to external light reaching the image projecting unit 10.

The invention is not limited to the aforementioned embodiments and can be modified in various forms within the scope defined in the claims. Embodiments obtained by appropriately combining technical means disclosed in different embodiments are included in the technical scope of the invention.

This international application claims priority to Japanese Patent Application No. 2021-059580 filed on Mar. 31, 2021, and details of the Japanese Patent Application No. 2021-059580 are incorporated herein by reference in its entirety.

The aforementioned description of specific embodiments of the invention is presented for the purpose of exemplification. The embodiments are not comprehensive nor intended to limit the invention as described. It will be apparent to those skilled in the art that many modifications or alterations thereof are possible in view of the description details.

REFERENCE SIGNS LIST

10 . . . Image projecting unit
20, 40 . . . Freeform curved minor
30 . . . Intermediate mirror
50 . . . Windshield
60 . . . Viewpoint
70 . . . Virtual image

The invention claimed is:

1. An image projection device comprising:
an image projecting unit configured to emits projection light including an image;
a first freeform curved mirror configured to reflect the projection light incident from the image projecting unit;
an intermediate mirror configured to reflect the projection light incident from the first freeform curved mirror; and
a second freeform curved mirror configured to reflecting the projection light incident from the intermediate mirror and to cause the projection light to reach a viewpoint,
wherein a component in at least one imaging axis direction of the projection light reflected by the first freeform curved mirror forms an image at an intermediate imaging position before the projection light reaches the second freeform curved mirror, and
wherein the intermediate mirror is arranged at the intermediate imaging position.

2. The image projection device according to claim 1, wherein a length in the imaging axis direction of the intermediate mirror is less than a length in the imaging axis direction in an effective irradiation area of the image projecting unit.

3. The image projection device according to claim 1, wherein the intermediate mirror is a planar mirror having a substantially flat reflective surface.

4. The image projection device according to claim 1, wherein the intermediate mirror is a cold mirror which includes a dielectric multilayer and which is configured to reflects visible light and transmits infrared light and/or ultraviolet light.

5. The image projection device according to claim 1, wherein external light incident on the second freeform curved mirror in a reflection direction of the projection light from the second freeform curved mirror is reflected by the second freeform curved mirror and then is focused at a position farther than the intermediate mirror.

6. The image projection device according to claim 1, wherein a reference light beam of the projection light from the image projecting unit to the second freeform curved mirror forms the same propagation plane, and
wherein the imaging axis direction is included in the propagation plane.

7. The image projection device according to claim 1, wherein a polarizing filter that is configured to transmit a component in a polarization direction of the projection light is provided on an optical path of the projection light from the image projecting unit to the second freeform curved mirror.

8. The image projection device according to claim 7, wherein the polarizing filter is provided as a unified body with the intermediate mirror.

* * * * *